US011113067B1

(12) United States Patent
McDonald (10) Patent No.: US 11,113,067 B1
(45) Date of Patent: Sep. 7, 2021

(54) SPECULATIVE BRANCH PATTERN UPDATE

(71) Applicant: CENTAUR TECHNOLOGY, INC., Austin, TX (US)

(72) Inventor: Thomas C. McDonald, Austin, TX (US)

(73) Assignee: CENTAUR TECHNOLOGY, INC., Austin, TX (US)

(*) Notice: Subject to any disclaimer, the term of this patent is extended or adjusted under 35 U.S.C. 154(b) by 0 days.

(21) Appl. No.: 17/099,852

(22) Filed: Nov. 17, 2020

(51) Int. Cl.
*G06F 9/38* (2018.01)
*G06F 9/30* (2018.01)
*G06F 9/32* (2018.01)

(52) U.S. Cl.
CPC ........ *G06F 9/3844* (2013.01); *G06F 9/30029* (2013.01); *G06F 9/30047* (2013.01); *G06F 9/30058* (2013.01); *G06F 9/321* (2013.01); *G06F 9/3848* (2013.01)

(58) Field of Classification Search
CPC .................................................... G06F 9/3844
See application file for complete search history.

(56) References Cited

U.S. PATENT DOCUMENTS

| 2004/0225872 | A1* | 11/2004 | Bonanno | G06F 9/3848 |
| | | | | 712/239 |
| 2006/0190710 | A1* | 8/2006 | Rychlik | G06F 9/3806 |
| | | | | 712/240 |
| 2007/0150712 | A1* | 6/2007 | Ali | G06F 9/3851 |
| | | | | 712/239 |
| 2011/0320792 | A1* | 12/2011 | Bonanno | G06F 9/3806 |
| | | | | 712/240 |
| 2018/0314525 | A1* | 11/2018 | Sadasivam | G06F 9/30021 |

* cited by examiner

*Primary Examiner* — Jyoti Mehta
(74) *Attorney, Agent, or Firm* — McClure, Qualey & Rodack, LLP (57) ABSTRACT

In one embodiment, a microprocessor, comprising: first logic configured to detect that a fetched cache address matches at least one of two previous cache addresses; and second logic configured to adjust a branch pattern used for conditional branch prediction based on the match and combine the cache address with the adjusted branch pattern to form a conditional branch predictor address.

18 Claims, 5 Drawing Sheets

SPECULATIVE BRANCH PATTERN UPDATE

TECHNICAL FIELD

The present invention relates in general to microprocessors, and in particular, branch prediction in microprocessors.

BACKGROUND

Microprocessors today operate using a pipelined processing scheme whereby programming instructions are broken down into steps that are carried out concurrently throughout a plurality of stages of the pipeline. Instructions typically (e.g., 10-20% of programming code) comprise branch instructions, or simply branches, which include unconditional branches (e.g., branches that are always taken) and conditional branches (e.g., taken or not taken depending on evaluation of a specified condition). It is generally not known for certain whether a conditional jump will be taken or not taken until the condition has been calculated and the conditional jump has passed the execution stage in the instruction pipeline, which may cause delays in fetching the next instruction. Branch predictors have been developed that attempt to guess, at the front end of the pipeline, which direction (taken, not taken) a conditional branch will go and to what target address, and in doing so, improve the flow of instructions through the pipeline.

One branch predictor that is commonly used in microprocessors is referred to as a branch target address cache (BTAC). The BTAC comprises hardware logic that may include the use of a global history pattern of past branch instruction behavior to enable a prediction of a target address for a fetched branch instruction. In general, branch predictors for the BTAC may comprise a plurality of predictor tables used in conjunction with plural, multi-set associative cache memories or sides often denoted by letters, such as in the case of two cache memories of the BTAC, sides A and B. Each side may comprise multiple ways (e.g., 2-way, 4-way, etc.). Information for some example BTAC arrays may be found in U.S. Pat. Nos. 8,832,418 and 7,707,397.

For conditional branch prediction, the BTAC may use tagged geometric (TAGE) predictors, which includes multiple tables each having global branch history patterns of different lengths. Additional information on TAGE predictors may be found in "*A New Case for the TAGE Branch Predictor*", Andre Seznec, MICRO 2011: The 44$^{th}$ Annual IEEE/ACM International Symposium on Microarchitecture, 2011, ACM/IEEE, December 2011, Porto Allegre, Brazil, herein incorporated by reference in its entirety. With some microprocessors, the TAGE predictors normally use a branch pattern updated by the third previous fetch. This feature works well, but at times can produce poor predictions when the same branch is encountered within two fetches and there have been no recent conditional branches. Accordingly, the same pattern may be used for multiple instances of the same branch, and if the two instances of the branch resolve differently (e.g., taken or not taken), a misprediction can occur.

SUMMARY

In one embodiment, a microprocessor, comprising: first logic configured to detect that a fetched cache address matches at least one of two previous cache addresses; and second logic configured to adjust a branch pattern used for conditional branch prediction based on the match and combine the cache address with the adjusted branch pattern to form a conditional branch predictor address.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the invention can be better understood with reference to the following drawings. The components in the drawings are not necessarily to scale, with emphasis instead being placed upon clearly illustrating the principles of the present invention. Moreover, in the drawings, like reference numerals designate corresponding parts throughout the several views.

DETAILED DESCRIPTION

Certain embodiments of a speculative branch pattern update system and method are disclosed that improves branch prediction by adjusting the branch pattern used when a branch is encountered that matches the cache addresses from two previous fetches. In one embodiment, a speculative branch pattern update system comprises first logic that detects if a cache address matches at least one of two previous cache address. The speculative branch pattern update system further comprises second logic that adjusts a branch pattern used for conditional branch prediction based on the match and combines the cache address with the adjusted bit pattern to form a conditional branch predictor address. Through the changed conditional branch predictor address, branch prediction is based on a different branch pattern history than the previous branches, resulting in fewer mispredictions.

Digressing briefly, conditional branch predictors use a branch pattern that may be two or three fetches old, which can lead to the same old branch pattern being used for two occurrences of a branch, potentially leading to a misprediction. In contrast, certain embodiments of a speculative branch pattern update system detects if a given cache address used for conditional branch prediction matches one or more of two previous cache addresses and adjusts the branch pattern used for forming a conditional branch predictor (e.g., TAGE) address. The branch pattern, and hence TAGE address, is different than that used for branch prediction based on the previous cache addresses, hence providing a different branch prediction.

Having summarized certain features of a speculative branch pattern update system of the present disclosure, reference will now be made in detail to the description of a speculative branch pattern update system as illustrated in the drawings. While a speculative branch pattern update system will be described in connection with these drawings, there is no intent to limit it to the embodiment or embodiments disclosed herein. That is, while the invention is susceptible to various modifications and alternative forms, specific embodiments thereof are shown by way of example in the drawings and will herein be described in detail sufficient for an understanding of persons skilled in the art. It should be understood, however, that the drawings and detailed description thereto are not intended to limit the invention to the particular form disclosed. On the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, modules, circuits, logic, or other components may be described as "configured to" perform a task or tasks. In such contexts, "configured to" is a broad recitation of structure generally meaning "having circuitry or another physical structure that" performs, or is capable of performing, the task or tasks during operations. The circuitry may be dedicated circuitry, or more general processing circuitry operating under the control of coded instructions. That is, terms like "unit", "module", "circuit", "logic", and "component" may be used herein, in describing certain aspects or features of various implementations of the invention. It will be understood by persons skilled in the art that the corresponding features are implemented utilizing circuitry, whether it be dedicated circuitry or more general purpose circuitry operating under micro-coded instruction control.

Further, the unit/module/circuit/logic/component can be configured to perform the task even when the unit/module/circuit/logic/component is not currently in operation. Reciting a unit/module/circuit/logic/component that is configured to perform one or more tasks is expressly intended not to invoke 35 U.S.C. § 112(f) for that unit/module/circuit/logic/component. In this regard, persons skilled in the art will appreciate that the specific structure or interconnections of the circuit elements will typically be determined by a compiler of a design automation tool, such as a register transfer language (RTL) compiler. RTL compilers operate upon scripts that closely resemble assembly language code, to compile the script into a form that is used for the layout or fabrication of the ultimate circuitry.

That is, integrated circuits (such as those of the present invention) are designed using higher-level software tools to model the desired functional operation of a circuit. As is well known, "Electronic Design Automation" (or EDA) is a category of software tools for designing electronic systems, such as integrated circuits. EDA tools are also used for programming design functionality into field-programmable gate arrays (FPGAs). Hardware descriptor languages (HDLs), like Verilog and very high-speed integrated circuit hardware description language (VHDL) are used to create high-level representations of a circuit, from which lower-level representations and ultimately actual wiring can be derived. Indeed, since a modern semiconductor chip can have billions of components, EDA tools are recognized as essential for their design. In practice, a circuit designer specifies operational functions using a programming language like C/C++. An EDA software tool converts that specified functionality into RTL. Then, a hardware descriptor language (e.g. Verilog) converts the RTL into a discrete netlist of gates. This netlist defines the actual circuit that is produced by, for example, a foundry. Indeed, these tools are well known and understood for their role and use in the facilitation of the design process of electronic and digital systems, and therefore need not be described herein.

Figure 1A:
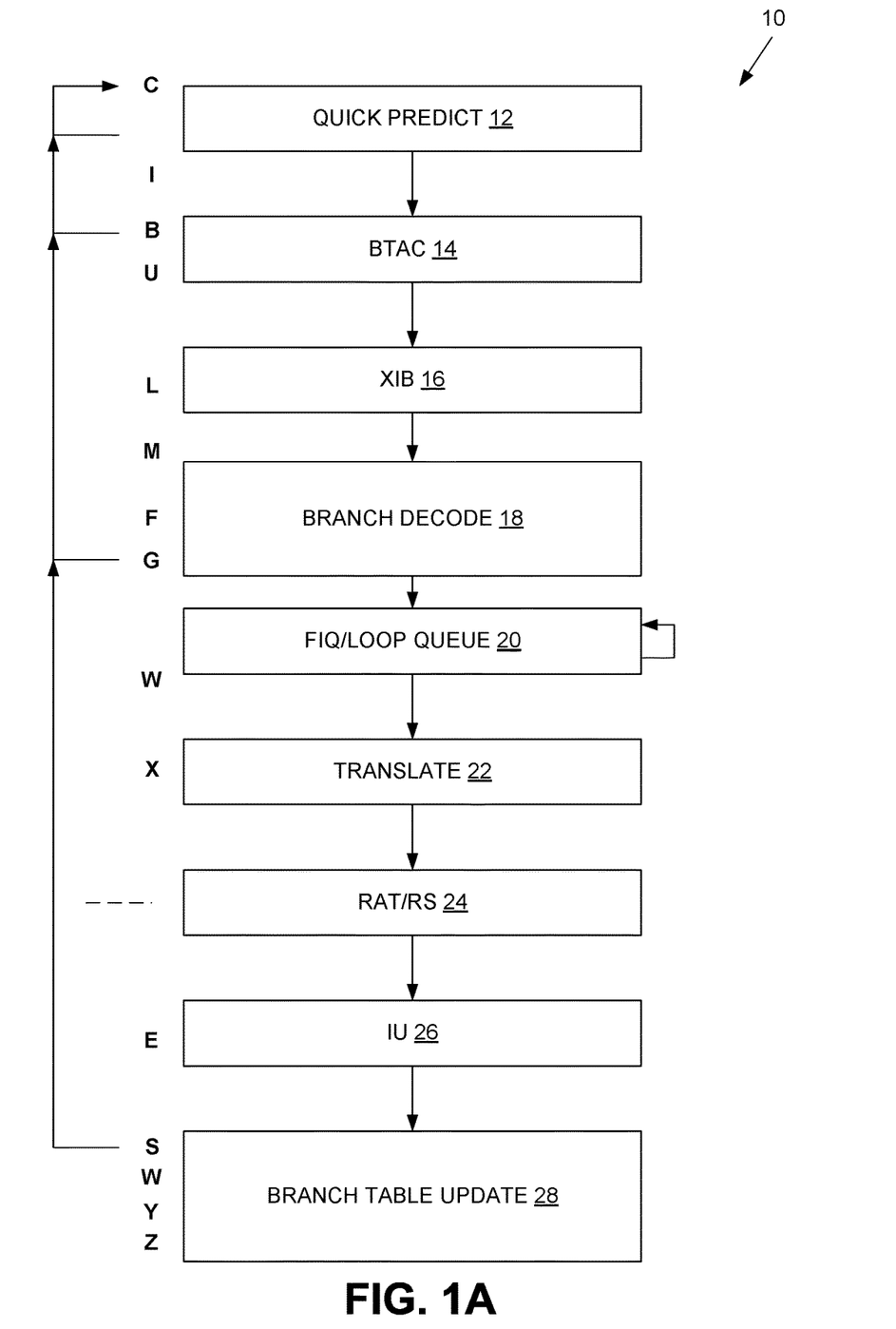
FIG. 1A is a block diagram showing an example branch unit pipeline for a microprocessor in which an embodiment of a speculative branch pattern update system is implemented.

FIG. 1A shows an embodiment of an example branch unit pipeline for a microprocessor 10. It should be appreciated that certain known components of a microprocessor 10 are omitted here for brevity and ease of explanation and illustration. As is known, the pipeline architecture provides for multiple instructions that are overlapped in execution, with each stage referred to as a pipe stage. The blocks shown in the branch unit pipeline may each be implemented according to one or more stages, those stages shown to the left of the blocks and represented in the depicted embodiment by the upper-case letters C, I, B, U, L, M, F, G, W, X, E, S, W, Y, and Z that are sequentially advanced from top-down and as redirected (as shown by the arrows). It should be appreciated by one having ordinary skill in the art that the number and/or arrangement of stages depicted in FIG. 1A is merely illustrative of one example embodiment, and that in some embodiments, a different number and/or arrangement of stages may be implemented and hence contemplated to be within the scope of the disclosure. It should also be appreciated by one having ordinary skill in the art that the blocks provide a general description of functionality for the branch pipeline, and that associated logic or circuitry known to those having ordinary skill in the art is omitted here for brevity. For instance, it should be appreciated by one having ordinary skill in the art that each stage of the pipeline may be separated by clocked pipeline registers or latches, as is known. As another example, though not explicitly shown in FIG. 1A, it should be appreciated by one having ordinary skill in the art that operations at the front end involve data exchange or interaction with an instruction cache.

An instruction cache is a random access memory device within a microprocessor into which the microprocessor places instructions of an ISA machine language program (such as x86 ISA machine language instructions) that were recently fetched and/or pre-fetched from larger cache (e.g., L2 cache, L3 cache) or system memory (e.g., fetched and/or pre-fetched from DRAM by a bus interface unit) and performed by the microprocessor in the course of running the ISA machine language program. The ISA defines an instruction address register that holds the memory address of the next ISA instruction to be performed (defined by the x86 ISA as an instruction pointer (IP) though sometimes referred to as a program counter (PC)), and the microprocessor updates the instruction address register contents as it runs the machine language program to control the flow of the program. The ISA instructions are cached for the purpose of subsequently fetching, based on the instruction address register contents, the ISA instructions more quickly from the instruction cache rather than from system memory the next time the flow of the machine language program is such that the register holds the memory address of an ISA instruction present in the instruction cache. In particular, an instruction cache is accessed based on the memory address held in the instruction address register (e.g., IP), rather than exclusively based on a memory address specified by a load or store instruction. Thus, a dedicated data cache that holds ISA instructions as data—such as may be present in the hardware portion of a system that employs a software translator—that is accessed exclusively based on a load/store address but not by an instruction address register value is not an instruction cache. Furthermore, a unified cache that caches both instructions and data (i.e., that is accessed based on an instruction address register value and on a load/store address, but not exclusively based on a load/store address) is intended to be included in the definition of an instruction cache for purposes of the present disclosure.

Directing attention in particular to the branch unit pipeline of the microprocessor 10 of FIG. 1A, the microprocessor 10 comprises a pipelined microprocessor whose instruction set, in one embodiment, conforms substantially to the x86 architecture instruction set. As will be appreciated by persons having ordinary skill in the art from the description provided herein, the present invention may be implemented in a variety of various circuit configurations and architectures, and the architecture illustrated in FIG. 1A is merely one of many suitable architectures. The example microprocessor 10 comprises a quick predictor 12, branch target address cache (BTAC) 14, instruction byte queue (XIB) 16, a branch decoder 18, format instruction queue (FIQ)/loop queue 20, instruction translator 22, register alias table (RAT)/reservation stations (RS) 24, functional units (e.g., integer unit, floating point unit, etc.) 26, and a branch table update 28. Each of the numerically-referenced blocks of the microprocessor 10 correspond to logical circuits that are implemented over the corresponding plurality of stages C, I, B, U, L, M, F, G, W, X, E, S, W, Y, and Z, with the pipeline architecture enabling different groups of instructions at every stage. In one embodiment, four or more instructions may be run at every stage, with control signals marking each stage along the pipeline. Stages in association with the quick predictor 12, BTAC 14, and XIB 16 involve accesses to an instruction cache (I-cache, not shown in FIG. 1A).

The quick predictor 12 comprises a single cycle branch predictor that provides for single cycle prediction (e.g., takes one cycle to produce a target address, the prediction provided at the I stage in one embodiment). In one embodiment, the quick predictor 12 comprises a table (also referred to herein as array or target array) that stores branch target addresses of previously executed branch instructions, the table enabling a branch prediction when the stored branch instructions are subsequently encountered. In one embodiment, the table comprises 128 entries, though tables of other sizes (e.g., 64 entries, 32 entries, etc.) may be used in some embodiments. The table is organized as an n-way (e.g., n is an integer greater than one) set associative cache. Generally, an n-way set associative cache is also referred to herein as a multi-set associative cache. In one embodiment, each entry stores eight (8), 3-bit counters and the current local branch pattern, the counter chosen by a 3-bit local branch pattern. The quick predictor 12 further comprises a conditional branch predictor that is accessed in parallel with the table and that provides a taken/not taken direction for conditional branches. The quick predictor further comprises a return stack that can provide a target instead of the table. In one embodiment, the return stack comprises four (4) entries and provides the target for return instructions. Note that the specifications listed above are merely for illustration, and that some embodiments may perform under different specifications and hence are contemplated to be within the scope of the invention. The quick predictor 12 is configured to deliver a predicted branch target immediately (within a single cycle) with no taken branch penalty. In some embodiments, the quick predictor 12 may operate according to other specifications for its prediction mechanism and/or table configuration, or in some embodiments, may be omitted.

Most branches are correctly predicted by the quick predictor 12. In some embodiments, where the quick predictor 12 provides a branch prediction that differs (e.g., difference in direction and/or target) from the branch prediction of the BTAC 14 based on the same fetched branch instruction, the BTAC 14 overrides the branch prediction of the quick predictor 12 and updates the quick predictor table within the set of stages of the BTAC 14, for instance, at the U stage, with the branch prediction information (e.g., direction, target address, branch prediction type) provided by the BTAC 14.

The I stage and/or B stage correspond to access to the various tables of the branch unit pipeline, including the I-cache, tag arrays, translation lookaside buffer (TLB) arrays, BTAC arrays, return stack arrays, etc., muxing out the direction or way (e.g., based on the tags), and reading out of the instructions.

The BTAC 14 holds information about previously executed branch instructions that it uses to predict the target address, direction, and type during subsequent executions. The BTAC 14 comprises one or more tables that are much larger than the table of the quick predictor 12. In one embodiment, the BTAC 14 comprises a 4k entry, m-way set-associative table (also referred to herein as array or target array), where m is an integer greater than one. Similar to n-way set-associative tables, m-way set-associative tables may also be referred to herein as multi-set associative tables. Each entry of the BTAC 14 comprises a valid bit, a branch target address prediction, a direction prediction, and a branch type. The branch type specifies whether the branch instruction is a call/return, indirect branch, conditional relative branch, or unconditional relative branch. In one embodiment, the BTAC 14 comprises or cooperates with a conditional relative branch predictor (or simply, conditional branch predictor) having a multiple entry (e.g., 12k) tagged geometric (TAGE)-based conditional branch predictor, multiple tables, a multi-bit (e.g., 3 bit), taken/not taken (T/NT) counter, and multi-bit global branch history. That is, the TAGE conditional branch predictor comprises tagged tables with geometrically increasing branch history lengths, as is known. As another example, the indirect prediction comprises a multiple entry (e.g., 1.5k) TAGE predictor and uses the table entries for static indirect branches. In one embodiment, two TAGE conditional branch predictors are used, one for side A and one for side B in a predictor array. The TAGE conditional branch predictor may be part of the BTAC or used in conjunction with the BTAC 14.

In one embodiment, the BTAC 14 comprises or cooperates with a second type of conditional branch predictor of lower complexity than the TAGE conditional branch predictor, for instance a gshare predictor associated with side C of the predictor array. The gshare conditional branch predictor may be a part of the BTAC 14 or used in conjunction with the BTAC 14. The gshare conditional branch predictor comprises a complexity in between that of the quick predictor 12 and the TAGE conditional branch predictors (e.g., approximately $\frac{1}{10}^{th}$ the size of the TAGE conditional branch predictor). In one embodiment, the gshare conditional branch predictor comprises a single table (e.g., m-bit global history register comprising a branch pattern of the last m executed branch instructions, where m is typically 10-12 bits though not limited to that quantity). The gshare conditional branch predictor uses a global branch history and a location (e.g., IP) of a branch instruction to create (via an XOR logical operation) an index into a table of counters (e.g., 2-bit counters), where the result of the index is a prediction for the current branch. As TAGE and gshare type conditional branch predictors are known in the art, further description of the same is omitted here for brevity. Further, though sides A, B, and C are emphasized herein, in some embodiments fewer or additional sides may be used. Note that in some embodiments, other types of prediction mechanisms may be used, including correlation-based prediction mechanisms, conditional branch predictors that use a combination of global and local branch history, etc. For each portion, or fetch quantum, of a cache line of the instruction cache (e.g., 16 bytes), the BTAC 14 can hold three entries (e.g., sides A, B, and C, though fewer sides may be used in some embodiments for storing prediction information for fewer branch instructions) that can hold prediction information for up to three branch instructions that may be present in a portion of the cache line. Note that further information of example BTACs may be found in U.S. Pat. Nos. 8,832,418 and 7,707,397, which are incorporated herein by reference to the extent consistent with the current disclosure. The BTAC 14 comprises operations through a set of stages (e.g., the I, B and U stages). In effect, the U stage of a branch instruction serves as a C stage for the target (e.g., the arrow from the B stage to the C stage reflects the situation of the branch instruction at the B stage and the next clock is the C stage of the target or herein also, the cache address), resulting in a two-clock delay for BTAC prediction.

The BTAC 14 has a two clock taken penalty, which also reveals a benefit of the quick predictor 12 in providing a rapid branch prediction (no taken penalty) by immediately steering the new cache address to be the target. In one embodiment, the BTAC 14, being larger than the quick predictor 12 and having a more sophisticated branch prediction mechanism, is configured to (e.g., always) override the branch prediction of the quick predictor 12 when there is a disagreement in branch prediction (e.g., the BTAC 14 determines a different branch prediction than the taken determination and/or branch target address determined by the quick predictor 12). In some embodiments, the BTAC 14 is configured to update the quick predictor 12 during one of the BTAC stages (e.g., the U stage) by writing the branch prediction information into the table of the quick predictor 12 (and also in the tables of the BTAC 14). In some embodiments, updates to the BTAC 14 are delayed until a branch is executed or retired, where the updates to the BTAC 14 involve writes to the predictor tables of the BTAC 14. In one embodiment, updates involve target information and/or counter updates. However, updates to the quick predictor 12 do not wait that long, occurring during a BTAC stage. Note that branches that are not in the quick predictor 12 are written into the quick predictor 12 two cycles later at a time corresponding to (e.g., during) a BTAC stage.

The XIB 16 is a queue of entries, each of which holds sixteen bytes of data from the instruction cache. For instance, the cache data that comes from the XIB 16 is simply a stream of instruction bytes that comes in sixteen byte blocks, and it is unknown where a given x86 instruction begins or ends within the stream or within a given block given that instructions are of variable length. The XIB 16 comprises known logic to determine and mark the beginning and ending byte of each instruction within the stream and thereby break up the stream of bytes into a stream of x86 instructions, which is provided to and stored in the FIQ/loop queue 20 for processing by the remainder of the microprocessor pipeline. In the L (length) stage, the XIB 16 determines the instruction lengths. In one embodiment, a predecoder (not shown in FIG. 1A) is implemented at the U stage, and is configured to detect potential branch instructions and mark them as such for each instruction byte in the queues. Notably, at this stage, there is ambiguity as to whether a given byte is the start of an instruction. If a byte is an opcode byte of a branch instruction determined at a later (M stage), then the instruction is affirmed as a branch instruction. For instance, the branch decoder 18 comprises an instruction mux (not shown) for muxing instructions in a mux or M stage, where the branch instructions are affirmed as such. Note that additional information on branch decoding may be found in U.S. Pat. No. 8,473,726, incorporated herein by reference in its entirety to the extent consistent with the current disclosure.

In the F stage, the instructions are formatted. In one embodiment, the formatted instructions comprise instructions conforming substantially to the x86 architecture instruction set. Also, a determination is made at the M stage whether a given instruction, perhaps marked preliminarily by the predecoder, was indeed a branch or not. For instance, where a miss occurred in the quick predictor 12 or BTAC 14 (e.g., at initial start-up), the branch decoder 18 (e.g., the instruction mux) decides the current instruction is a branch and redirects at stage G the cache address to the new target and update the tables in the front end of the microprocessor 10. In effect, the branch decoder 18 provides for branch prediction when missed at the quick predictor 12 or BTAC 14, where the branch instruction transitions to the target at the C stage. In some circumstances, such as where there are more than a limited or predetermined maximum number of branches per fetch (e.g., more than three per 16 byte fetch) at the BTAC 14, branch prediction for the extra branch is delayed until decode time.

The FIQ/loop queue 20 receives the formatted instructions and buffers them until they can be translated into microinstructions. The FIQ/loop queue 20 also provides for a preliminary decoding and fast looping function (e.g., on a BTAC loop branch, the loop queue is activated and loop instructions are repeatedly sent), the latter represented by the arrow at the right hand side of the block 20.

The W stage provides for an optional extra timing clock.

At the X stage, the instruction translator 22 translates (in the X or translate stage) the formatted instructions stored in the FIQ/loop queue 20 into microinstructions.

The instructions are provided in program order to a register alias table/reservation station (RAT/RS) tables 24. The RAT functionality of the RAT/RS 24 maintains and generates dependency information for each instruction. The RAT functionality of the RAT/RS 24 renames the sources and destinations of the instructions onto internal registers, and dispatches the instructions to reservation stations of the RAT/RS 24, which issue the instructions, potentially out of program order, to functional units 26. The functional or execution units 26, which include integer units, execute branch instructions at stage E (execution). Execution units, branch units, and integer units are terms that are used interchangeably herein. In one embodiment, the execution units 26 (e.g., two execution units) execute two branches in a single clock cycle. The execution units 26 also indicate whether the BTAC 14 has correctly predicted the branch instruction.

Results of the execution are provided in one embodiment to a reorder buffer (not shown), which comprises information pertaining to instructions that have been executed. As is known, the reorder buffer keeps the original program order of instructions after instruction issue and allows result serialization during a retire stage. In one embodiment, some of the information of the reorder buffer may be stored elsewhere along the pipeline, such as at the decoder 18. Information stored in the reorder buffer may include branch information, such as type of branch, branch patterns, targets, the tables used in the prediction, and cache replacement policy information (e.g., least recently used or LRU).

The branch table update 28 comprises stages S, W, Y, and Z, and is configured to update (e.g., at the S stage) the various tables at the front end (e.g., BTAC, TAGE) with information about the fully decoded and executed branch instruction (e.g., the final result of the branch). The update may involve, at stages S, W Y, and Z, a table read, a target address write, and a counter increment or decrement, which may involve some delays. In one embodiment, the branch table update 28 provides an indication of a misprediction for a given conditional branch instruction and the side (e.g., A, B, or C) in which the conditional branch instruction is cached.

Figure 1B:
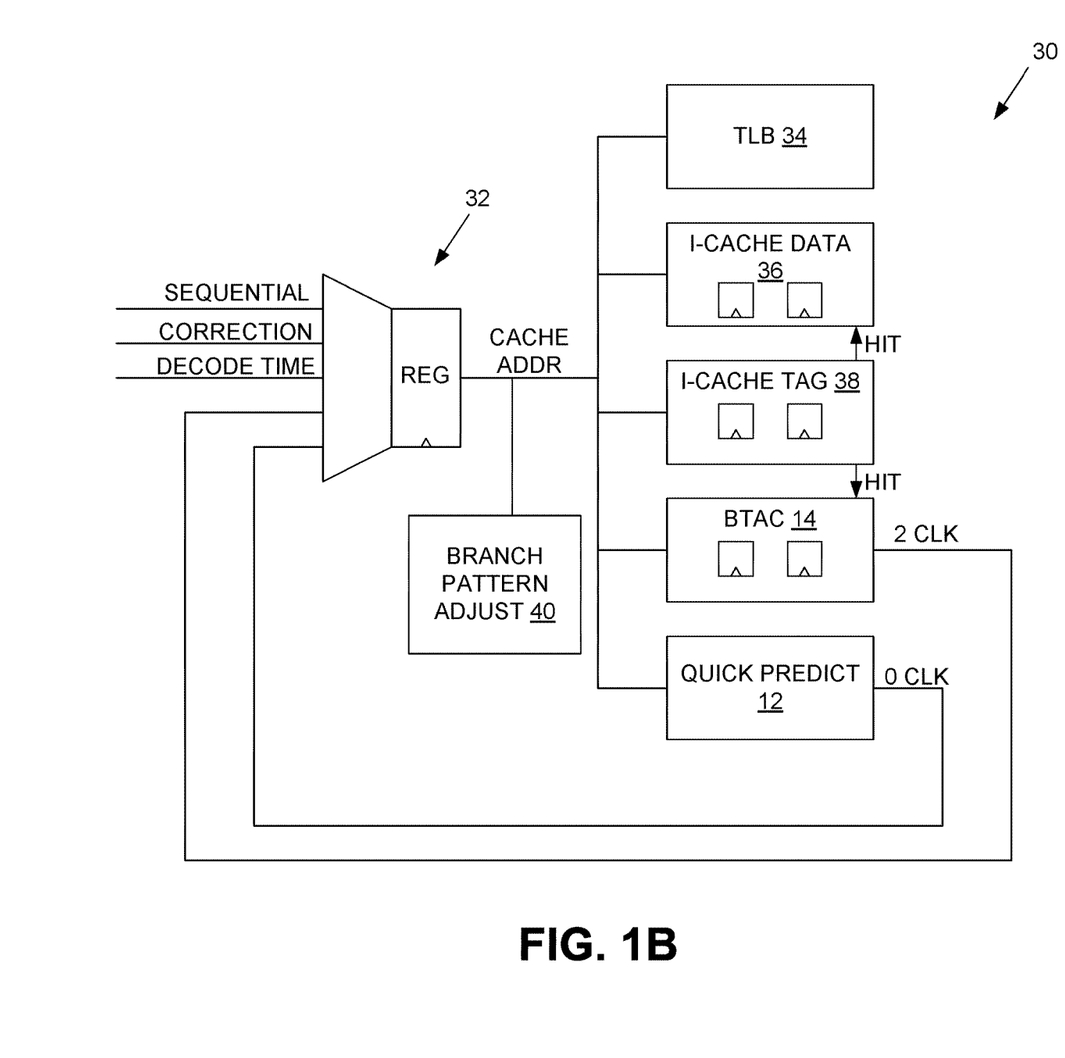
FIG. 1B is a schematic diagram showing an example front end of the branch unit pipeline shown in FIG. 1A.

Referring now to FIG. 1B, with continued reference to FIG. 1A, shown is an example quick predictor 12 and other example sources used at a front end 30 of the branch unit pipeline shown for the microprocessor 10 of FIG. 1A. The front end 30 comprises a fetch unit 32 (e.g., including a mux and clocked register), a translation lookaside buffer (TLB) 34, an instruction cache (I-cache data) 36, I-cache tag 38 (or tag array), the BTAC 14, and the quick predictor 12. The fetch unit 32 receives plural sources of cache instruction addresses, including a sequenced instruction address (e.g., from the I-stage), corrected instruction address (e.g., from the S stage), decode time instruction address (e.g., from the G stage), and addresses from the BTAC 14 and quick predictor 12. The output of the fetch unit 32 is a cache address that is provided as inputs to the TLB 34, I-cache data 36, I-cache tag 38, BTAC 14, and quick predictor 12 for accessing the next instruction of the I-cache data 36.

The TLB 34, under management by a memory management unit (not shown), provides for a virtual to physical page address translation as is known. That is, the TLB 34 stores the physical addresses of the most recently used virtual addresses. The TLB 34 receives a linear address from a segmentation unit (which converts the logical address from a program into the linear address), and a portion of the linear address is compared to the entries of the TLB 34 to find a match. If there is a match, the physical address is calculated from the TLB entry. If there is no match, a page table entry from memory is fetched and placed into the TLB 34.

The I-cache data 36 comprises a level 1 cache of instructions that have been fetched or prefetched from L2, L3 or main memory. The I-cache data 36 comprises multiple clocked registers.

The I-cache tag 38 comprises an array of tags corresponding to the instructions in the I-cache data 36, and comprises multiple clocked registers, and is used to determine a match between information associated with the fetched cache instruction (e.g., the tag or portion of the cache address) to the I-cache data 36 and BTAC 14.

The BTAC 14 is explained above in association with FIG. 1A, and has multiple clocked registers and a two (2) clock taken penalty. The quick predictor 12, also explained above, has a zero (0) clock taken penalty. For instance, assume fetches along the I-cache at 16 bytes per cycle, and assume a branch instruction at cache address 20 to cache address 95. Note that hexadecimal notation (e.g., 0x0, 0x10, 0x20, etc.) is implied by the address descriptions in this example. Thus, fetches occur at cache address 0, cache address 10, cache address 20 (the branch instruction, but not yet resolved since the BTAC 14 read and mux span multiple cycles, which in some embodiments is the same timing as the I-cache), cache address 30 (relative clock 1), cache address 40 (relative clock 2), and then on the 3rd clock (relative clock 3), the cache instruction fetch is redirected to cache address 95. The taken branch penalty thus comprises two clock cycles in this example, since cache address 30 and 40 occur after the branch. In other words, without the quick predictor 12, the taken branch penalty is always two clocks for this particular design example. With the smaller and faster quick predictor 12, the cache address fetches, in the above example, comprise 0, 10, 20 and 95, with no delay on the cache address and zero taken penalty. As noted above, in some embodiments, the quick predictor 12 may be omitted.

The front end 30 further comprises branch pattern adjust logic 40 that is configured to detect if the cache address for a conditional branch instruction matches one or more of two previous cache addresses, and further configured to adjust a branch pattern used by the fetched cache address, as explained further below in association with FIG. 2. However, before describing the branch pattern adjust logic 40 in further detail, some additional background may facilitate a further understanding of branch prediction shortcomings resolved by the branch pattern adjust logic 40. As is known, superscalar microprocessor architectures make use of multiple instruction pipelines to execute several instructions concurrently during a given clock cycle. Referring to FIG. 1A, instructions at cache addresses (e.g., using a shorthand, hexadecimal format for ease of illustration) 00, 10, 20, 30, 40, etc. may be implemented concurrently at stages C, I, B, and U. For instance, at the U stage, the microprocessor may detect a branch (e.g., with a direction prediction of not taken (NT)) of the instruction at cache address 10, whereas an instruction at cache address 40 is just beginning to undergo processing (e.g., at the C stage). Though the programming flow is unaffected by the NT branch (e.g., as cache addresses 20 and 30 have already entered the pipeline), there needs to be a branch pattern update. Since updates in at least some microprocessors do not occur until the third fetch, for cache addresses 20 and 30, it is too late for an update. Yet cache address 10 corresponding to the NT conditional branch affects the pattern used with the cache address 40 at the C stage. Thus, since cache address 40 at the C stage is three fetches back from cache address 10 at the U stage, cache address 40 encounters an updated bit pattern based on the NT branch at cache address 10. Any branches in cache-line fetches at respective cache addresses 20 and 30 encounter a past branch pattern (not an updated branch pattern based on the NT branch at cache address 10), since these addresses are within a three fetch delay. Similarly, if, say, cache address 30 is a taken branch (to cache address 95), then subsequent cache addresses 40 and 50 are discarded (e.g., cache addresses between 30 and 95 are discarded), and then cache addresses that follow include (from cache address 95) cache address 100, 110, 120, etc. Given the three-fetch-back update, the fetch at cache address 110 sees the branch pattern change at cache address 30, and yet the taken branch at cache address 95 affects the pattern for cache address 110 (which is not seen at cache address 110 given the three-fetch back updates). This delayed update is inherent to the speculative branch process, though some microprocessors may have a different degree of delay (e.g., a two-fetch delay). Note that some researchers address this issue by recommending predicting every possible outcome in parallel, though a downside to such an approach is the use of added read ports and hence increased chip size to update the more recent branches into the pattern.

Where the above-described, inherent process to speculative branch prediction may face challenges is when the same branch pattern is used for a branch that needs to be predicted differently (which leads to a misprediction). For instance, assume sequential fetch cache addresses 100, 110, 120, 130, and 140 and all comprise no branches (and hence no pattern change), and then cache address 150 comprising a NT conditional branch is fetched. In that case, cache address 150 for the NT conditional branch uses the branch pattern of the third previous cache address (e.g., cache address 120). Assume there is a later branch instruction that results in a fetch from the same cache address (e.g., at cache address 150, such as a branch instruction at cache address 160 that is redirected to cache address 150), leading to a second occurrence of cache address 150, but this time program flow requires a taken conditional branch redirected to cache address, say, 200. With a three fetch look-back, the branch pattern update is based on cache address 140 (e.g., given the cache fetch sequence of 140, 150, 160, 150). However, recall in this example that there are no branches in the range of cache addresses 100-140. In other words, the branch pattern at cache address 120 (the update used by the first occurrence of cache address 150) is the same as the branch pattern at 140 (the update used by the second occurrence of cache address 150). The conditional branch predictor is unable to distinguish these different prediction directions (taken versus not taken), since the branch pattern used is the same, resulting in the same conditional branch predictor (TAGE) address formed from the branch pattern being used, leading to identical predictions (either both taken, or both not taken). Obviously, one of these predictions is wrong in this example, leading to a misprediction.

As yet another example, there may be instances where cache address 150 is fetched, and then a branch backwards at cache address 160 (e.g., back to the branch at cache address 150). Indeed, such a circumstance may occur within the branch fetch itself (e.g., instead of cache address 160, say a cache address within the fetch at 150, say cache address 159, 15F, etc., where the branch redirected the process to cache address 150). Regardless, there is a repeated fetch address where different branch directions may take place.

Figure 2A:
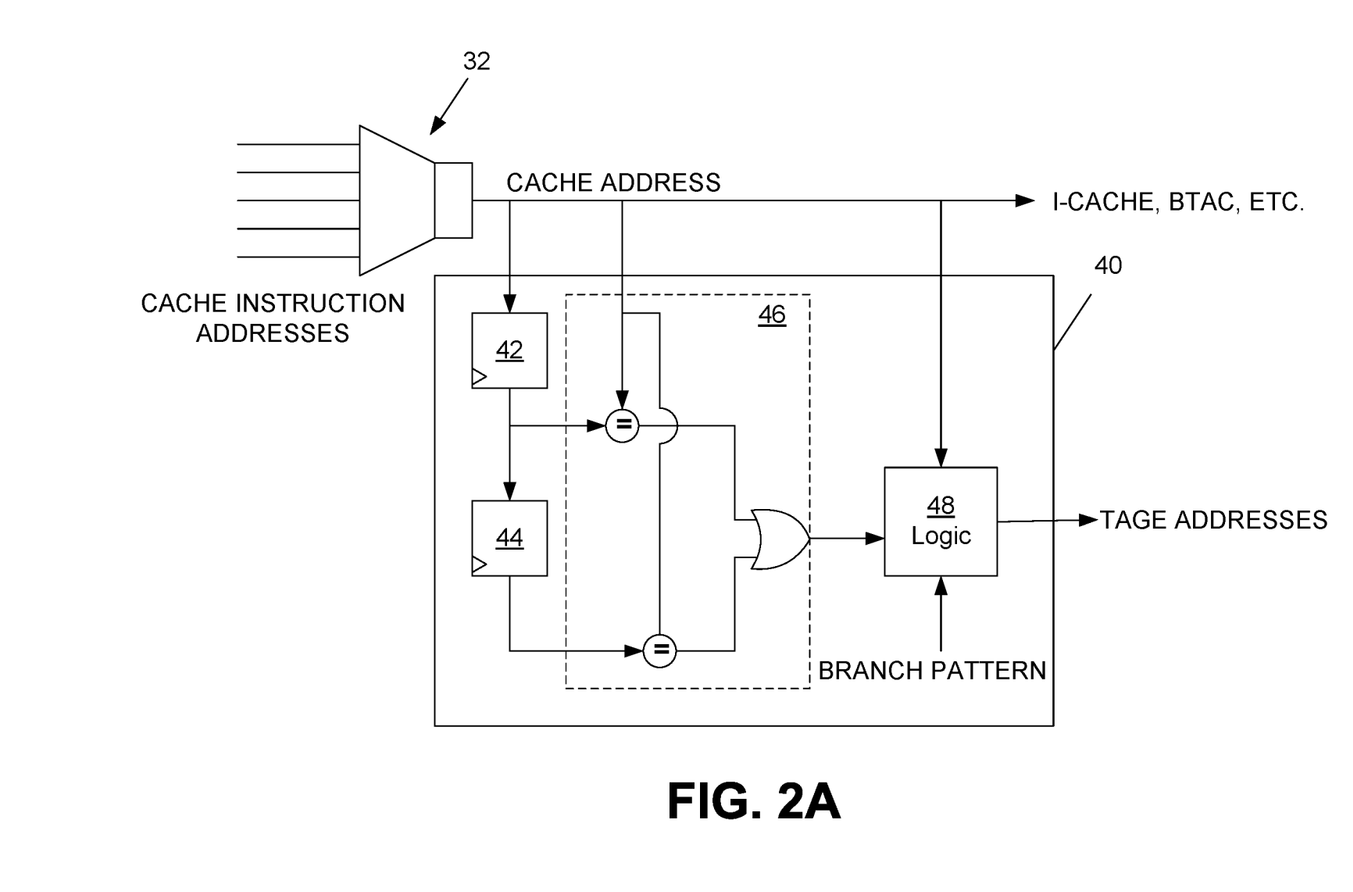
FIG. 2A is a schematic diagram that shows an embodiment of example branch pattern adjust logic used in an embodiment of a speculative branch pattern update system.

One solution to the above is described in association with FIG. 2A, where repeated fetch addresses are detected and branch prediction is based on an adjusted branch pattern. In particular, FIG. 2A shows one embodiment of the branch pattern adjust logic 40 shown in FIG. 1B configured to receive the cache address from the fetch unit 32. The branch pattern adjust logic 40 comprises first logic for detecting a match of a current cache address with one or more of two previous cache addresses, and second logic for adjusting a branch pattern used for the previous cache addresses and using the adjusted branch pattern to form a conditional branch predictor (e.g., TAGE) address that is sent to a TAGE table to provide a different prediction than the prediction derived from the previous cache addresses. In one embodiment, the branch pattern adjust logic 40 comprises a first register 42, a second register 44, and comparator logic 46 corresponding to the first logic. The branch pattern adjust logic 40 further comprises logic 48 configured to flip plural bits of the branch pattern that shows the effects of previous branches associated with the previous fetches of the cache address. The register 42 is configured to store a cache address used in the previous cycle, and the register 44 is configured to store the cache address used two cycles ago. The outputs of the registers 42, 44 are input to the comparator logic 46, where a comparison is made between the fetched cache address and the cache address from the previous cycle from register 42, and a further comparison is made between the fetched cache address and the cache address from two cycles ago from register 44). A match of either (e.g., at OR logic) means the potential for a duplicate branch pattern used for conditional branches of different taken or not taken directions that can potentially cause a misprediction.

Figure 2B:
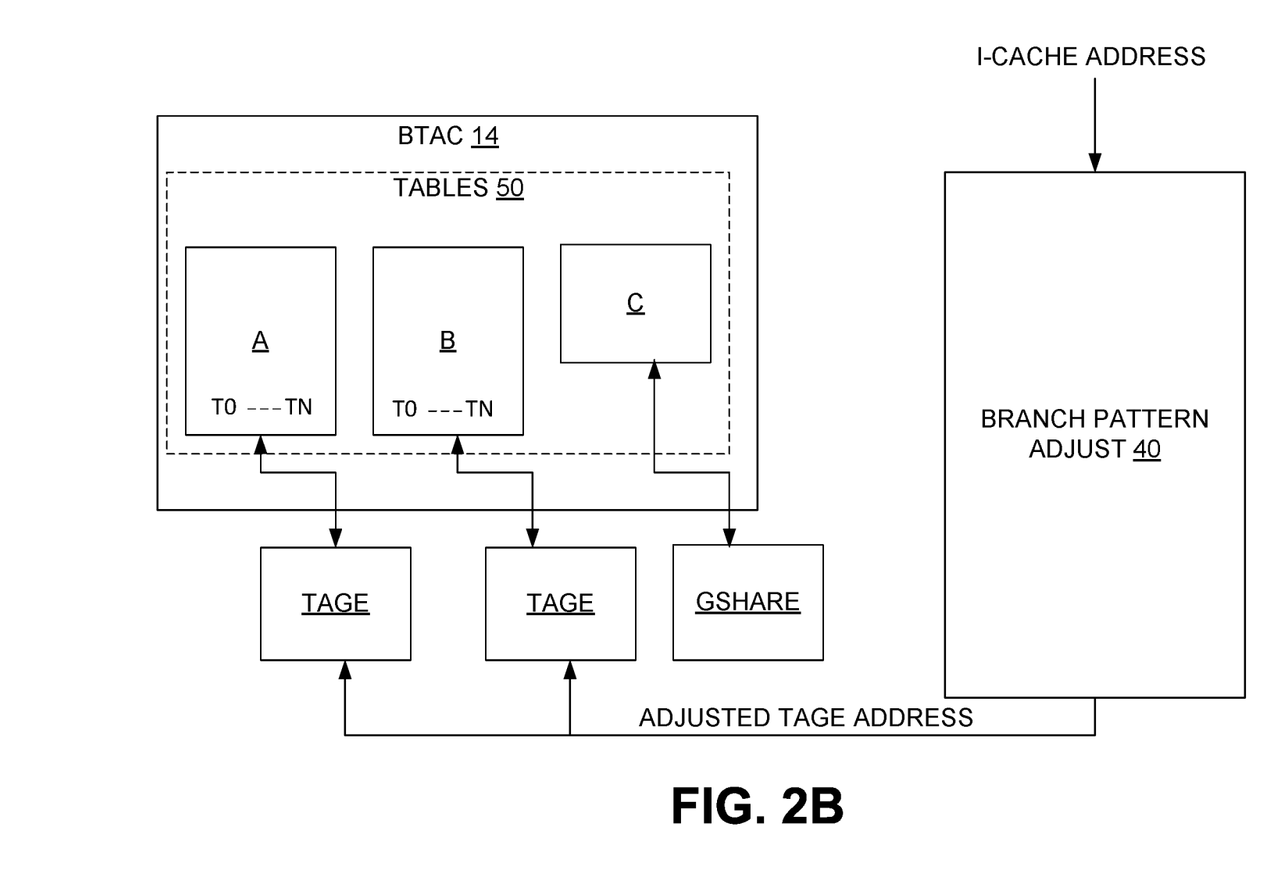
FIG. 2B is a schematic diagram that shows conditional branch predictor and tables used in an embodiment of an example speculative branch pattern update system.

The second logic comprises the logic 48 is configured to perform the branch pattern update. The logic 48 receives the current branch pattern, the fetched cache address, and the indication of a match, and flips one or more bits of the branch pattern. For instance, the logic 48 flips two bits of the branch pattern and forms a new TAGE address by combining (e.g., via an XOR operation) the updated branch pattern with the cache address, the TAGE address used to access tables of a TAGE predictor. Accordingly, the fetched cache address gets a different prediction since it uses a different branch pattern (which is used to form a different TAGE table address than that used by the previous cache address fetches. As shown in FIG. 2B, the BTAC 14 has or is coupled to branch prediction tables 50. In one embodiment, the branch prediction tables 50 (or simply referred to as tables) comprise a first side (A), a second side (B), and a third side (C), though a different number of sides may be used in some embodiments. Each of the first and second sides A, B comprises a group of multi-set associative tables corresponding to respective first conditional branch predictors, or more specifically, TAGE conditional branch predictors (one for side A, one for side B). The third side comprises a single table comprising a single conditional branch predictor (e.g., gshare conditional branch predictor), though in some embodiments, the third side may be omitted or associated with a different conditional branch predictor and/or number of tables. The plural tables T0-TN are in respective sides A and B, where N is an integer number greater than one. It should be appreciated by one having ordinary skill in the art that both the BTAC 14 and the conditional branch predictors (TAGE, gshare) have a multi-sided array (each having sides A, B, and C). For instance, if a branch exists in side B of the BTAC 14, it also exists in side B of the conditional predictors. As shown in FIG. 2B, each of sides A, B of the prediction tables 50 have a separate TAGE conditional predictor, and side C has a gshare conditional branch predictor.

Explaining the match and bit flipping further, and with continued reference to FIGS. 2A-2B and using the examples described above, the cache address 150 from two cycles ago does not get an address match, and hence no bits are flipped. Say for instance the branch pattern is all zeroes. The TAGE address sent to the TAGE predictor table 50 corresponding to cache address 150 is sent into the TAGE tables and from that, a prediction results. The second time there is an address match (e.g., for fetched cache address 150), the branch pattern adjust logic 40 detects this scenario, and flips bits of the branch pattern, say, bits [8] and [2], which is used to form a different TAGE address from that used for the previous occurrence of cache address 150. Based on this process, there are different branch patterns (and hence different TAGE table entries by virtue of the different TAGE addresses formed from the different branch patterns), thus resulting in different predictions.

Referring again to FIG. 2B, the TAGE tables are shown with tables T0-TN for sides A and B. In one embodiment, the tables 50 include TAGE tables T1-T8, each with 512 entries. The TAGE addresses for T1-T8 are formed according to cache_address [8:0] XOR branch_pattern [8:0], where the branch pattern is different for each table (there also exists table T0, which comprises 2k entries with no branch pattern). At each TAGE address for T1-T8, there is an 11 bit tag and a 3 b counter value. Reads of the tables need a tag match to hit. In one embodiment, the two bits flipped include bits

[8] and [2], though other bits and/or fewer or additional bits may be flipped depending on an assessment from performance testing or other measures. As similarly explained above, the TAGE addresses are formed based on cache_address [8:0] XOR branch_pattern [8:0] XOR spec_adjust [8:0], where spec_adjust equals a binary value of: 100000100 (which flips bits [8] and [2]). Note that the XOR operations disclosed above may include the addition of a cache_address [17:9], which may be used to distribute accesses more evenly. Also, since the TAGE addresses are formed by XORing the cache address with variations of the branch pattern, it should be appreciated by one having ordinary skill in the art that such an operation is logically equivalent to flipping bits [8] and [2] of the cache address, or flipping bits [8] and [2] of the TAGE address. Regardless the branch pattern adjustment is performed at the same times as forming of the TAGE address (e.g., cache_address XOR pattern XOR adjust_field). It should be appreciated by one having ordinary skill in the art in the context of the present disclosure that the aforementioned specifications provide an illustrative example, and that some embodiments may use different specifications. In effect, the second occurrence of the branch is treated as a distinct, individual branch, which enables the TAGE predictor to learn to predict both occurrences correctly. When there is a misprediction of the second occurrence, the prediction is corrected. Without the address adjust, when this prediction is corrected, it also changes the prediction for the cache address two cycles ago, since both use TAGE addresses for the same entry in the tables—which could result in the first occurrence being mispredicted. Note that in some instances, the correct predictions may well be both taken or both not taken, but then there is no harm aside from using an extra entry in the tables.

One notable special case to the process described above is where the branch was not seen twice. For instance, assume the cache address 150 example from above, where the process branches into cache address 150 at a point past that branch. Assume cache address fetches 100, 110, 120, 130 (which branches to 158), 158 (no conditional branch seen), 160 (branch to 150), and 150 (taken conditional branch to 200) and 200. So from 130, there is a branch into 158, where there is no branch but there is a branch at 150 which is not seen. Later at cache address 160, there is a branch back to cache address 150, where the address matching triggers. However, if the cache address at 158 is the target of a branch, and no conditional branch is seen, then the conditional branch is not actually seen twice. To address this, in one embodiment, the branch pattern adjust logic 40 suspends branch pattern adjustment if the conditional branch is only seen once (e.g., there is detection when the cache address is seen twice, but the branch is seen only once since the first occurrence of the branch has been skipped over by a different branch). In other words, for the special case when the fetch address matches, but the fetch was the target of a branch, if no conditional branches are seen due to the branch target skipping over them, the adjustment is suspended (e.g., disabled or turned off). It is noted that address bits [3:0] are typically not used in the comparison, so cache address 158 should normally match with cache address 150.

As set forth above, certain embodiments of a speculative branch pattern update system adjusts the branch pattern, which when combined with the cache address, produces adjusted TAGE addresses. These TAGE addresses are used to read the TAGE tables.

Figure 3:
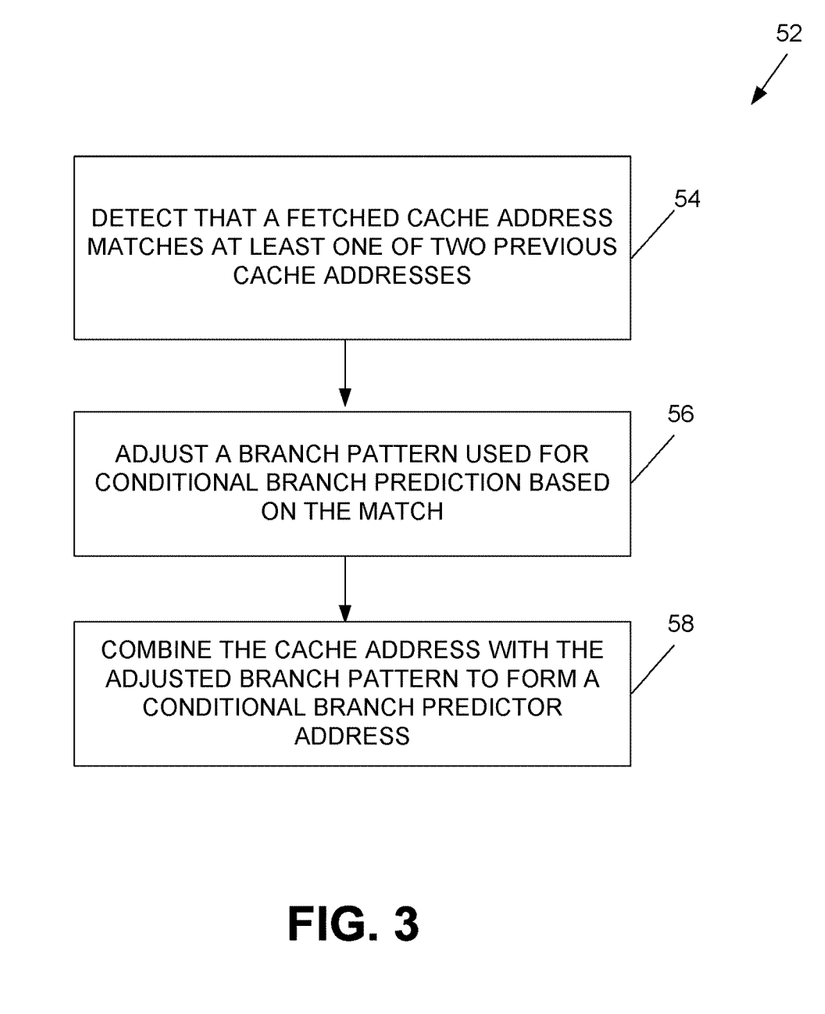
FIG. 3 is a flow diagram that shows an embodiment of an example speculative branch pattern update method.

In view of the above description, it should be appreciated by one having ordinary skill in the art that a speculative branch pattern update method, denoted method 52 in FIG. 3 and implemented in one embodiment by the microprocessor, comprises: detecting that a fetched cache address matches at least one of two previous cache addresses (54); adjusting a branch pattern used for conditional branch prediction based on the match (56); and combining the cache address with the adjusted branch pattern to form a conditional branch predictor address (58).

Any process descriptions or blocks in flow diagrams should be understood as representing modules, segments, logic, or portions of code which include one or more executable instructions for implementing specific logical functions or steps in the process, and alternate implementations are included within the scope of the embodiments in which functions may be executed out of order from that shown or discussed, including substantially concurrently or in different order, depending on the functionality involved, as would be understood by those reasonably skilled in the art of the present disclosure.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

Note that various combinations of the disclosed embodiments may be used, and hence reference to an embodiment or one embodiment is not meant to exclude features from that embodiment from use with features from other embodiments. In the claims, the word "comprising" does not exclude other elements or steps, and the indefinite article "a" or "an" does not exclude a plurality.

At least the following is claimed:

1. A microprocessor, comprising:
   first logic configured to detect that a cache address matches at least one of two previous cache addresses; and
   second logic configured to adjust a branch pattern used for conditional branch prediction based on the match and combine the cache address with the adjusted branch pattern to form a conditional branch predictor address.

2. The microprocessor of claim 1, wherein the first logic comprises a first register to store a first cache address of one of the two previous cache addresses used two cycles ago and a second register to store a second cache address of the other of the two previous cache addresses used one cycle ago.

3. The microprocessor of claim 2, wherein the first logic further comprises compare logic to compare the cache address with the first cache address and compare the cache address with the second cache address.

4. The microprocessor of claim 3, wherein the first logic is configured to determine the match based on an output of the compare logic.

5. The microprocessor of claim 4, wherein the second logic is configured to adjust the branch pattern by flipping one or more bits of the branch pattern.

6. The microprocessor of claim 5, wherein the second logic is configured to form the conditional branch predictor address via an XOR operation between the flipped one or more bits and the cache address.

7. The microprocessor of claim 5, wherein predictions for branches corresponding to the two previous cache addresses are cached in a conditional branch table for a TAGE predictor.

8. The microprocessor of claim 7, wherein the second logic sends the conditional branch predictor address to the conditional branch table, the conditional branch predictor address used to read the conditional branch table at a different entry than that used for conditional branch prediction based on the first cache address.

9. The microprocessor of claim 8, wherein the different entry to the conditional branch table comprises a different branch prediction counter than that used for conditional branch prediction based on the first cache address.

10. A speculative branch pattern update method implemented by a microprocessor, the speculative branch pattern update method comprising:
   detecting by first logic that a cache address matches at least one of two previous cache addresses;
   adjusting by second logic a branch pattern used for conditional branch prediction based on the match; and
   combining by the second logic the cache address with the adjusted branch pattern to form a conditional branch predictor address.

11. The speculative branch pattern update method of claim 10, further comprising storing with a first register of the first logic a first cache address of one of the two previous cache addresses used two cycles ago and storing with a second register of the first logic a second cache address of the other of the two previous cache addresses used one cycle ago.

12. The speculative branch pattern update method of claim 11, further comprising comparing by compare logic the cache address with the first cache address and comparing the cache address with the second cache address.

13. The speculative branch pattern update method of claim 12, further comprising determining by the first logic the match based on the comparing.

14. The speculative branch pattern update method of claim 13, further comprising adjusting by the second logic the branch pattern by flipping one or more bits of the branch pattern.

15. The speculative branch pattern update method of claim 14, further comprising forming by the second logic the conditional branch predictor address via an XOR operation between the flipped one or more bits and the cache address.

16. The speculative branch pattern update method of claim 14, wherein predictions for branches corresponding to the two previous cache addresses are cached in a conditional branch table for a TAGE predictor.

17. The speculative branch pattern update method of claim 16, further comprising sending by the second logic the conditional branch predictor address to the conditional branch table, the conditional branch predictor address used to read the conditional branch table at a different entry than that used for conditional branch prediction based on the first cache address.

18. The speculative branch pattern update method of claim 17, wherein the different entry to the conditional branch table comprises a different branch prediction counter than that used for conditional branch prediction based on the first cache address.

* * * * *